United States Patent [19]

Redmore

[11] 3,764,548
[45] Oct. 9, 1973

[54] OXYGEN SCAVENGER AND USE THEREOF
[75] Inventor: Derek Redmore, Ballwin, Mo.
[73] Assignee: Petrolite Corporation, Wilmington, Del.
[22] Filed: Sept. 13, 1971
[21] Appl. No.: 180,091

[52] U.S. Cl............... 252/188, 21/2.7 R, 166/310, 210/63, 252/8.5 A, 252/8.55 D, 252/8.55 E, 252/178, 252/387, 252/428, 252/430
[51] Int. Cl...................... C23f 15/00, C23f 11/18
[58] Field of Search ................ 252/8.55 D, 8.55 E, 252/8.5 C, 8.5 A, 188, 428, 430, 178; 166/275, 310, 300, 303; 260/370; 21/2.7 R

[56] References Cited
UNITED STATES PATENTS

| | | | |
|---|---|---|---|
| 1,899,957 | 3/1933 | Gubelmann et al. | 260/370 |
| 2,170,596 | 8/1939 | Quiggle | 252/188 |
| 3,106,525 | 10/1963 | Schmid et al. | 252/8.55 X |
| 3,273,955 | 9/1966 | Goerrig et al. | 252/188 X |
| 3,618,667 | 11/1971 | Snavely | 166/275 |
| 3,625,888 | 12/1971 | Redmore et al. | 252/8.55 |
| 3,645,896 | 2/1972 | Larsen | 252/8.55 |

*Primary Examiner*—Herbert B. Guynn
*Attorney*—Sidney B. Ring

[57] ABSTRACT

An oxygen scavenger composition characterized by (1) a catalyst comprising an anthraquinone disulfonic acid or salt thereof and a vanadate salt such as sodium vanadate and (2) a reducing agent such as $H_2S$ or hydrazine; and processes for scavenging, with said composition, oxygen from corrosive media including oxygen or air wherein said oxygen or air causes said media to be corrosive or to increase the corrosiveness of said media.

10 Claims, No Drawings

OXYGEN SCAVENGER AND USE THEREOF

The presence of air or oxygen increases the corrosiveness of a system, for example, drilling fluids or air drilling systems used in drilling oil and gas wells, brines employed in the secondary recovery of petroleum by water flooding and in the disposal of waste water and brines from oil and gas wells, steam generating systems, water circulating systems, automobile radiators, diesel locomotive engines, boiler water, sea water ship ballast, etc; in fact, in any system where oxygen or air is present, its presence causes or increases corrosion. Therefore it is highly desirable to remove oxygen from such systems. The practice of removing dissolved oxygen from such systems is so well known that the agent employed to achieve this result is known as an oxygen scavenger.

Although oxygen scavengers are effective in certain systems, they often pose difficulties therein. For example, sodium bisulfite employing a cobalt catalyst is not effective as an oxygen scavenger in the presence of $H_2S$ because the cobalt catalyst is deactivated by $H_2S$. Furthermore, the bisulfite system is not effective as an oxygen scavenger in the presence of polyamine-derived corrosion inhibitors, the most widely used corrosion inhibitors, since they inactivate the oxygen scavenging system.

I have now discovered an oxygen scavenger system which is characterized by (1) a catalyst comprising an anthraquinone disulfonic acid (AQ) and a vanadate salt such as sodium vanadate ($Na_3VO_4$) and (2) a reducing agent such as $H_2S$, hydrazine, etc.

This system is also effective in the presence of $H_2S$ and polyamine-derived corrosion inhibitors. In fact, the presence of $H_2S$ in the oxygen containing system, which generally produces a particularly corrosive system, is turned to an advantage in the present invention in that $H_2S$ acts as the reducing agent.

The oxygen scavenging reaction may be summarized as follows:

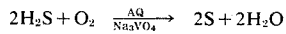

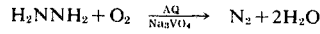

In general, the system is employed in two ways (1) by adding the $AQ/Na_3VO_4$ mixture to the system followed by the addition of the reducing agent or (2) pre-reducing the $AQ/Na_3VO_4$ mixture with the reducing agent prior to addition to the oxygen-containing system. However, where the oxygen-containing system also contains $H_2S$, an extremely corrosive system, it is necessary to add only the $AQ/Na_3VO_4$ mixture since $H_2S$ acts as the reducing agent.

All the known isomers of anthraquinone disulphonic acid are suitable for use in this process. These are:
Anthraquinone-1,5-disulphonic acid.
Anthraquinone-1,6-disulphonic acid.
Anthraquinone-1,7-disulphonic acid.
Anthraquinone-1,8-disulphonic acid.
Anthraquinone-2,6-disulphonic acid.
Anthraquinone-2,7-disulphonic acid.

Also mixtures of these isomers may be used with advantage, including commercially available mixtures which contain 1,5/1,8 or 2,6/2,7 anthraquinone disulphonic acids and possibly small quantities of other isomers. Salts of these sulfonic acids are also included within the scope of the invention, for example, alkali metal salts, alkali earth salts, etc.

Any suitable vanadate salt can be employed such as alkali metal vanadates, most preferably sodium or potassium vanadates.

Any effective ratios of anthraquinones to vanadate can be employed, such as from about 15:1 to 1:15, for example from about 10:1 to 1:10, but preferably from about 5:1 to 1:5.

Any effective concentration of anthraquinone can be employed, depending in part on the concentration of oxygen present, for example at least 10 ppm, such as from about 10 to 500 ppm, for example from about 20 to 250 ppm, but preferably from about 20 to 100 ppm per ppm of oxygen. Greater amounts can be employed where desired, but there is generally no economic advantage in doing so.

The amount of $H_2S$ or hydrazine present in the system should be sufficient to reduce the oxygen.

The following examples are presented by way of illustration and not of limitation.

All examples were carried out using 200 ml of tapwater at approximately 20°C contained in a conical flask in which the oxygen probe is inserted. The oxygen concentrations vs. time are recorded on strip chart recorder connected to the oxygen meter. The rates of oxygen removal listed below are obtained by determining reduction of oxygen content in 10 minutes (or in time to reduce to zero if less than 10 minutes). The initial oxygen content varies from 7 to 8 ppm.

Table 1 presents the rate of oxygen removal vs. hydrazine concentration, using a solution containing vanadate and anthraquinone.

TABLE 1

| Example | *Quinone (ppm) | **Vanadate (ppm) | Hydrazine (ppm) | Rate of Oxygen Removal (ppm min.$^{-1}$) |
|---|---|---|---|---|
| 1 | 500 | 250 | 500 | 1.5 |
| 2 | 500 | 250 | 125 | 1.4 |
| 3 | 500 | 250 | 31 | 0.62 |
| 4 | 500 | 250 | 15 | 0.57 |
| 5 | 250 | 125 | 125 | 0.74 |
| 6 | 250 | 125 | 62.5 | 0.64 |
| 7 | 250 | 125 | 31 | 0.50 |
| 8 | 250 | 125 | 125 | 0.66 |
| 9 | 250 | 125 | 250 | 1.28 |
| 10 | 250 | 125 | 7.5 | 0.18 |

\* Quinone refers to anthraquinone 2,6-disulfonic acid, sodium salt in Table 1–5.
\*\* Vanadate refers to sodium vanadate in Tables 1–5.

The following table shows rate of oxygen removal employing a quinone/vanadate ratio of 1:1 with hydrazine or $H_2S$ as reducer.

TABLE 2

| Example | Reducing System (ppm) | Rate of Oxygen Removal (ppm min.$^{-1}$) |
|---|---|---|
| 11 | Quinone (125) Vanadate (125) Hydrazine (125) | 1.55 |
| 12 | Quinone (125) Vanadate (125) Hydrazine (31) | 0.45 |
| 13 | Quinone (62.5) Vanadate (62.5) Hydrazine (125) | 0.40 |
| 14 | Quinone (125) Vanadate (125) $H_2S$ (10) | 0.90 |
| 15 | Quinone (125) Vanadate (125) $H_2S$ (20) | 2.24 |

The following table, Table 3, shows the importance of both quinone and Vanadate using hydrazine as reducing agent.

TABLE 3

| Example | Quinone (ppm) | Vanadate (ppm) | Hydrazine (ppm) | Rate of Oxygen Removal (ppm min.$^{-1}$) |
|---|---|---|---|---|
| 16 | 250 | 0 | 125 | 0.08 |
| 17 | 0 | 250 | 125 | 0.03 |
| 18 | 125 | 125 | 125 | 0.56 |
| 19 | 250 | 0 | 250 | 0.12 |
| 20 | 0 | 250 | 250 | 0.03 |
| 21 | 125 | 125 | 250 | 0.63 |
| 22 | 250 | 125 | 250 | 0.75 |

Table 4 illustrates the effect of various ratios of quinone/vanadate. In all cases H$_2$S is reducing agent at approximately 20-30 ppm.

TABLE 4

| Example | Quinone (ppm) | Vanadate (ppm) | Rate of Oxygen Removal (ppm min$^{-1}$) |
|---|---|---|---|
| 23 | 250 | 0 | 0.08 |
| 24 | 125 | 125 | 2.56 |
| 25 | 100 | 125 | 2.4 |
| 26 | 50 | 125 | 1.18 |
| 27 | 25 | 125 | 0.60 |
| 28 | 10 | 125 | 0.50 |
| 29 | 10 | 125 | 0.42 |
| 30 | 125 | 100 | 2.0 |
| 31 | 125 | 50 | 1.8 |
| 32 | 125 | 25 | 0.88 |
| 33 | 125 | 10 | 0.16 |

Table 5 illustrates effect of added corrosion inhibitor (H$_2$S is employed as reducing agent).

TABLE 5

| Example | Quinone (ppm) | Vanadate (ppm) | Inhibitor (ppm) | Rate of Oxygen Removal (ppm min$^{-1}$) |
|---|---|---|---|---|
| 34 | 125 | 125 | None | 2.8 |
| 35 | 125 | 125 | *A (1000) | 1.65 |
| 36 | 125 | 125 | **B (1000) | 1.24 |

* Inhibitor A is the reaction product of a polyamine and a fatty acid.
** Inhibitor B is polymeric imidzaoline as described in U.S. Pat. No. 3,450,646.

In general, the commercial application of the process is carried out as follows:

To the oxygen-containing water or brine is added a solution containing anthraquinone sulfonic acids, vanadate and sufficient hydrazine to react with the oxygen. In a flowing system such as a water injection system the oxygen scavenging system can be continuously metered in with a pump. If the brine contains H$_2$S it is only necessary to inject the anthraquinone sulfonic acid and vanadate.

I claim:

1. An oxygen scavenger composition of
   I. a catalyst of
      1. a compound selected from the group consisting of anthraquinone - 1,5-disulfonic acid, anthraquinone - 1,6-disulfonic acid, anthraquinone - 1,7-disulfonic acid, anthraquinone - 1,8 - disulfonic acid, anthraquinone - 2,6-disulfonic acid, anthraquinone - 2,7-disulfonic acid, mixtures thereof, alkali metal salts thereof, alkali earth salts thereof, and mixtures thereof, and
      2. alkali metal vanadate salt,
   and
   II. reducing agent selected from the group consisting of H$_2$S, hydrazine and mixtures thereof, II being present in an amount sufficient to reduce the oxygen present,
   I being present in an amount sufficient to catalyze the reaction between the oxygen present and II, the ratio of the amount of I (1) to I (2) being from about 15:1 to 1:15.

2. The composition of claim 1 where II is H$_2$S or hydrazine.

3. The composition of claim 2 where II (2) is sodium vanadate.

4. The composition of claim 3 where II is H$_2$S.

5. The composition of claim 3 where II is hydrazine.

6. A process of scavenging oxygen from aqueous corrosive media having oxygen or air wherein said oxygen or air causes said media to be corrosive or to increase the corrosiveness of said media characterized by adding to said media the composition of claim 1.

7. A process of scavenging oxygen from aqueous corrosive media having oxygen or air wherein said oxygen or air causes said media to be corrosive or to increase the corrosiveness of said media characterized by adding to said media the composition of claim 2.

8. A process of scavenging oxygen from aqueous corrosive media having oxygen or air wherein said oxygen or air causes said media to be corrosive or to increase the corrosiveness of said media characterized by adding to said media the composition of claim 3.

9. A process of scavenging oxygen from aqueous corrosive media having oxygen or air wherein said oxygen or air causes said media to be corrosive or to increase the corrosiveness of said media characterized by adding to said media the composition of claim 4.

10. A process of scavenging oxygen from aqueous corrosive media having oxygen or air wherein said oxygen or air causes said media to be corrosive or to increase the corrosiveness of said media characterized by adding to said media the composition of claim 5.

* * * * *